United States Patent

Van Den Burg et al.

[11] Patent Number: 6,048,557
[45] Date of Patent: Apr. 11, 2000

[54] PUFA COATED SOLID CARRIER PARTICLES FOR FOODSTUFF

[75] Inventors: Anthonius Cornelis Van Den Burg, GB Rijswijk; Jan Willem Groenendaal, EE Delft, both of Netherlands

[73] Assignee: DSM N.V., Netherlands

[21] Appl. No.: 08/821,023

[22] Filed: Mar. 19, 1997

Related U.S. Application Data

[60] Provisional application No. 60/015,116, Apr. 10, 1996.

[30] Foreign Application Priority Data

Mar. 26, 1996 [EP] European Pat. Off. .............. 96200814

[51] Int. Cl.⁷ ...................................... A23D 9/00
[52] U.S. Cl. ................ 426/99; 426/89; 426/96; 426/601
[58] Field of Search ................ 426/98, 601, 99, 426/89

[56] References Cited

U.S. PATENT DOCUMENTS

| | | |
|---|---|---|
| 2,911,300 | 11/1959 | Peebles . |
| 5,013,569 | 5/1991 | Rubin ...................................... 426/585 |
| 5,518,753 | 5/1996 | Bracco . |

FOREIGN PATENT DOCUMENTS

| | | |
|---|---|---|
| 0 047 142 | 3/1982 | European Pat. Off. . |
| 0 231 904 A2 | 1/1987 | European Pat. Off. . |
| 0 404 058 A2 | 6/1990 | European Pat. Off. . |
| WO 91 07105 | 5/1991 | European Pat. Off. . |
| 0 639 333 | 2/1995 | European Pat. Off. . |
| 1 390 268 | 12/1963 | France . |
| 27 00 817 | 7/1978 | Germany . |
| 62-126933 | 6/1987 | Japan . |
| 62-079732 | 9/1987 | Japan . |
| 6303902 | 1/1994 | Japan . |
| 6-240287 | 8/1994 | Japan . |
| 6240287 | 8/1994 | Japan . |
| 6-303902 | 11/1994 | Japan . |
| 455 010 | 5/1968 | Switzerland . |
| 1045704 | 10/1966 | United Kingdom . |
| 1164462 | 9/1969 | United Kingdom . |
| 1165320 | 9/1969 | United Kingdom . |
| 1 346 888 | 2/1974 | United Kingdom . |
| 1544304 | 4/1979 | United Kingdom . |
| WO 88 02221 | 4/1988 | WIPO . |
| WO 92/12711 | 8/1992 | WIPO . |
| WO 95 06414 | 3/1995 | WIPO . |

OTHER PUBLICATIONS

Database WPI, week 9439; Derwent Publications Ltd., London, GB; AN 94–313994.

Database WPI, week 9439; Derwent Publications Ltd., London, GB; AN 87–196270.

*Primary Examiner*—Carolyn Paden
*Attorney, Agent, or Firm*—Morrison & Foerster LLP

[57] ABSTRACT

The present invention relates to a process for the preparation of a polyunsaturated fatty acid (PUFA)-containing composition where a PUFA-containing lipid is adsorbed onto a solid carrier, such as a powder. This can be used in a process for preparing an infant formula, such as where the powdered PUFA-containing lipid is added after an emulsion of oil and water phases has been formed.

18 Claims, 1 Drawing Sheet

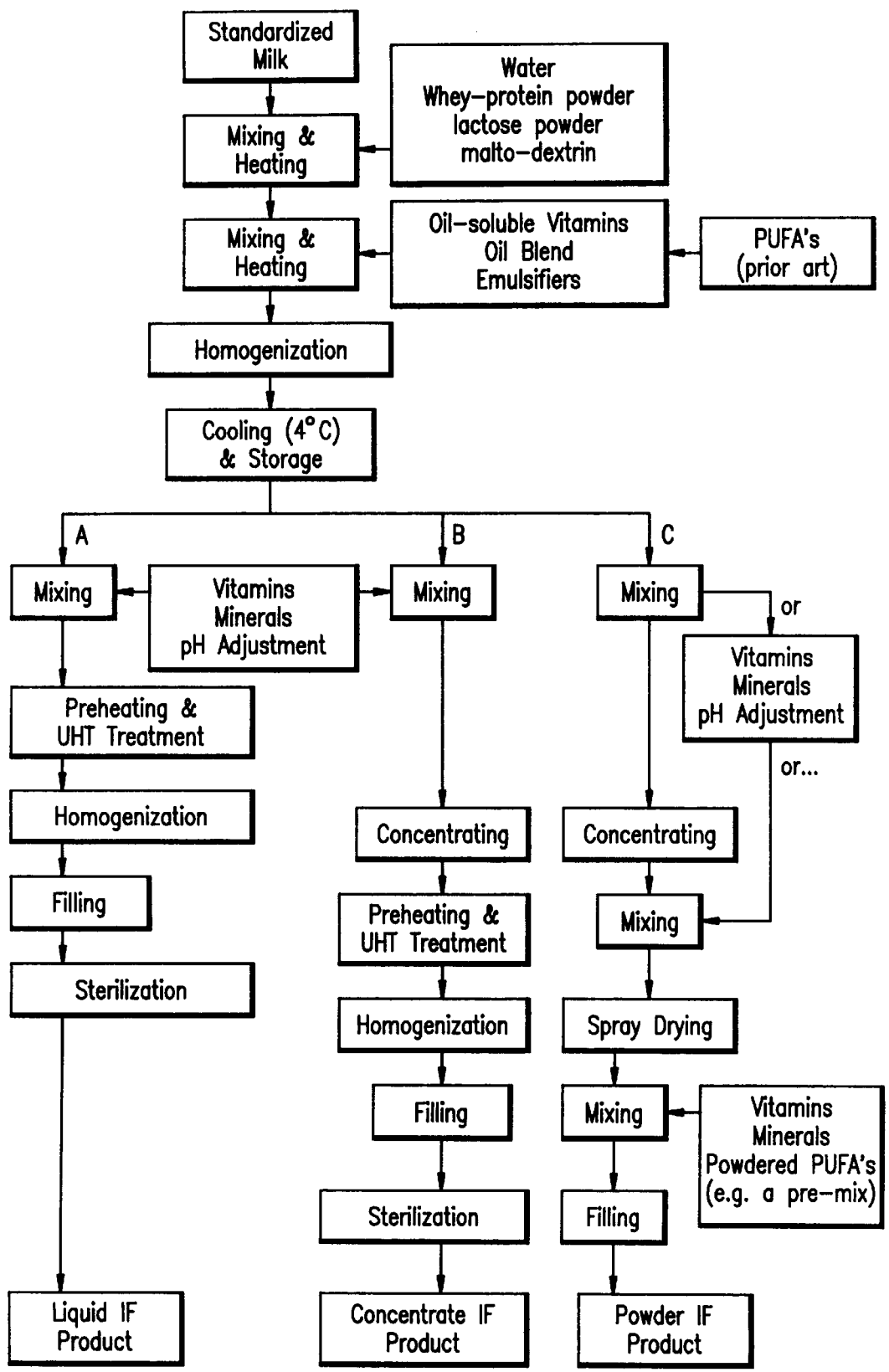

PUFA COATED SOLID CARRIER PARTICLES FOR FOODSTUFF

This application claims the benefit of U.S. Provisional Application Ser. No. 60/015,116, filed Apr. 10, 1996 now abandoned.

FIELD OF THE INVENTION

The present invention is in the field of nutrition especially infant nutrition. It relates to foods, such as infant formula containing fatty acids, and solid carriers coated with a PUFA for the manufacture of such foods.

BACKGROUND OF THE INVENTION

Recently, the importance of the addition of polyunsaturated fatty acids (PUFA's) to infant formulas has been acknowledged (see for instance U.S. Pat. No. 4,670,285 and European Patent Publications EP-A-0231904 and EP-A-0404058).

Infant formula is usually prepared by the following general process.

1. Pasteurised milk (skimmed, evaporated or whole milk) is standardised by the addition of whey protein concentrate, minerals, water-soluble vitamins, trace elements and carbohydrates at high temperatures, for example 60° C.

2. Vegetable oil, oil-soluble emulsifiers, oil-soluble vitamins and anti-oxidants are mixed at high temperatures, for example 60° C.

3. The oil mixture obtained from 2 (an oil phase) is added to the standardised milk obtained from 1 (a water phase) with sufficient agitation to allow mixing.

4. The mixture obtained in 3 is homogenised in two stages at high temperature and pressure, for example 60° C. at 150 and 30 bar.

5. The emulsion obtained under 4 is cooled to a low temperature, for example 5° C.

6. If desired, water-soluble vitamins, minerals and trace elements are added to the cooled emulsion.

7a. Emulsion 6 is sterilised on-line at ultra high temperature (UHT) and/or in appropriate containers to obtain a formula in the form of a sterile liquid; or 7b. Emulsion 6 is pasteurised and spray dried to give a spray dried powder which is filled into appropriate containers.

8. If desired, other dry ingredients, e.g. vitamins, minerals, trace elements, whey protein concentrate and carbohydrates can be added to the spray dried powder from 7b.

Thus at several points in the infant formula preparation process high temperatures and pressures are used, for example during the following process steps:

melting and blending fats in the oil phase (2) ;

dissolving oil soluble emulsifiers in the oil phase before homogenisation (2);

pasteurisation before homogenisation (in 4);

homogenisation (4);

sterilisation (7a);

pasteurisation after homogenisation (7b); and/or spray drying, if performed (7b).

Typically, the PUFA 's which are used for the supplementation of infant formula are in a triglyceride, phospholipid, fatty acid or fatty acid ester form and are oily liquids. The most convenient way to disperse PUFA-containing lipids homogeneously is by mixing them in with the oil phase before the homogenisation step. Thus, currently, the PUFA-containing lipid is added to the oil phase, because the PUFAs are usually contained in lipids which themselves are oils. This is much easier than trying to homogeneously disperse the PUFAs in the formula at a later stage, especially once the emulsion in (3) has been formed.

International patent application WO-A-94/01001 refers to the necessity of protecting PUFA-containing lipids from substances which attack the double bonds. It describes a microencapsulation process for PUFA-containing lipids, by providing these lipids in a free flowing powdered form to be readily mixed with other dry or liquid components.

BRIEF DESCRIPTION OF THE DRAWINGS

FIG. 1 is a flow diagram of a process for making infant formula which illustrates where PUFA's were added in a prior art process in contrast to where it is added in embodiments A, B, and C of the invention.

DESCRIPTION OF THE INVENTION

According to a first aspect of the present invention there are provided solid carrier particles on to which have been coated, or absorbed, at least one polyunsaturated fatty acid (PUFA) in liquid form.

A second aspect of the present invention relates to a process for the preparation of a foodstuff comprising a polyunsaturated fatty acid (PUFA), the process comprising:

a) providing an oil phase and an aqueous phase;

b) mixing the oil and aqueous phases to obtain an emulsion;

c) optionally, drying the emulsion to obtain a dried material; and d) adding particles of the first aspect.

Preferably the PUFA content of the particles is from 5 to 50%, such as from 10 to 40%, and optimally from 15 to 30% (by weight) of the particles. Preferably the solid particle is water-soluble. This means that if the particles are included in a foodstuff, such as an infant formula, and then added to water the particles dissolve, liberating the PUFA. If the particles are to be included into a foodstuff, then suitably the particles are edible. The solid particles can be crystalline. The PUFA preferably will be coated onto the outside of the particles. The particles are preferably in the form of a powder.

In certain embodiments the particles can be porous. Here, the (or each) PUFA may be present or contained in one or more of the pores of the particles. This is preferred because not only does it increase the amount of PUFA that can be located on (or inside) a particle, but additionally the PUFA may be at least partially protected, for example from the environment and therefore to oxidation.

The particles themselves can comprise a large number of different materials. Such materials are preferably of food grade. They may suitably also have a large surface area. As mentioned before, the particles can have a high porosity, and/or are preferably water dispersible.

Suitable adsorbent substances for the particles may therefore comprise at least one or more sugars and/or carbohydrates and/or proteins. Sugars and carbohydrates can include lactose, glucose, lecithin, dextrin and/or starch. Proteins can comprise whey proteins, casein and/or gelatine.

For certain substances, such as lactose, glucose, lecithin, dextrins and/or whey proteins, the particles can be formed by spray drying. This may make them more suitable for absorption of the PUFA as it may increase their surface area and/or porosity.

Less preferred, although contemplated by the invention, are other solid materials such as silicon dioxide (silica) cellulose (such as microcrystalline cellulose), powdered cellulose, bentonite, kaolin, magnesium aluminium silicate and/or magnesium carbonates.

Combinations or mixtures of these substances can be employed, for example to increase the dispersibility or water solubility of the particles.

A second aspect of the present invention relates to a composition comprising the particles of the first aspect. Such a composition may be a food, foodstuff, or other edible composition (eg. a nutritional supplement. This can include bread, health foods, and/or vitamin tablets.

The particles of the first aspect of the invention can be added therefore at a number of stages during preparation of the foodstuff, such as an infant formula. In particular, it is preferably added at a stage other than addition to the initial oil phase. This can minimise subsequent exposure to potentially degradative procedures. Preferably, the particles are added after the oil and aqueous phases have been mixed to form an emulsion (and suitably after homogenisation).

The particles of the first aspect, which will usually be in the form of a powder, can provide foodstuff manufacturers with a number of options concerning when the PUFA can be added in a foodstuff preparation process. A foodstuff producer can therefore determine at which point the PUFA should be added, depending on the various process steps involved. In particular, it can provide flexibility whereby the PUFA can be added at a stage other than addition to the starting oil phase (usually before homogenisation).

The particles of the first aspect thereby enable the person skilled in the art to alter the stage or time of addition of the PUFA during the foodstuff manufacturing process. Exposure of the PUFA to high temperatures and/or pressures can thereby be minimised, or even prevented. One advantage of the particles is that they can be easily dispersed in an aqueous solution, such as water. This phenomenon does not usually occur when a pure PUFA (or a PUFA containing liquid) is employed. This can be an advantage because PUFAs are only needed in small amounts, relatively speaking, in the foodstuff preparation process. An additional advantage has been found that the particles may enhance the stability of the or each PUFA (there may be more than one present).

The particles of the first aspect may also provide advantages over microcapsulated forms of PUFAs. This is because the release of the PUFA from the particle can be quick after reconstitution (for example, addition to an aqueous phase). This may be caused by the structure of the particles, which is usually open or porous. The surface of the particles can be covered with a thin layer of PUFA and the pores of the particles can be open for the entry for water. In addition, one can employ water soluble particles.

A preferred process for preparing a foodstuff comprising a polyunsaturated fatty acid (PUFA) the process comprising:
  a) providing an oil phase and an aqueous phase;
  b) mixing and homogenising the oil and water phases to obtain an emulsion;
  c) sterilising and/or drying the emulsion to obtain a sterile liquid or a dried material; and
  d) adding solid carrier particles onto which have been absorbed, or that are coated with, at least one PUFA.

It will thus be seen that in the second aspect of the invention the PUFA can be added at a relatively late stage in the preparation of the foodstuff. The advantage of this is that the or each PUFA may be minimally exposed to conditions which can cause degradation.

There are usually three main causes of degradation during a conventional foodstuff preparation process that contains a PUFA. These are heating, drying and homogenisation. Heating can take place at a number of places during prior art preparative processes. This includes heating of the oil phase, as well as heating during homogenisation and sterilisation, and of course pasteurisation. The process of the invention seeks to minimise the exposure of the PUFAs to these various steps in order to maximise the preservation of the PUFA, and therefore to minimise degradation. Thus, in the process for producing a PUFA-containing foodstuff, the particles of the first aspect can be added at a stage after one or more potentially PUFA-degrading stage(s) have occurred. The PUFA may therefore be added after one or more heating and/or drying stages. Preferably, the PUFA is added after the drying step in (c). This drying may comprise spray drying.

The foodstuff is preferably one that is suitable for consumption by humans, such as babies and/or infants. It may therefore be an infant formula. Such a formula will usually comprise milk. However, the foodstuff may be a milk or milk substitute. The foodstuff can therefore be a powdered milk product.

The foodstuff can be a solid, in which case it is preferably dried, and optimally in the form of a powder. Preferably, it is miscible or dispersible in an aqueous liquid, such as water. Such foodstuffs may therefore produce a milk-like product on addition to water.

The foodstuff can also be in a liquid form (e.g. in the case of an infant formula), which is ready for use, or a concentrated liquid form which can be diluted before use with water. If the foodstuff is a liquid then the drying in (c) can be omitted.

Alternatively, the infant formula may be a powdered product, in which case this can be added to water. (The resulting lipid composition is often then warmed, e.g. to 35° C., before administration). In a solid form, the foodstuff may not only be an infant formula, but may be a milk powder suitable for addition to coffee, tea, chocolate or other such beverages.

The PUFA can be coated on, or absorbed onto, the particles in a variety of forms. However, it is usually part of or a component of a liquid composition. If liquid, this may be a lipid composition and/or an oil. The oil may contain solely the PUFA or it may contain a number of other ingredients.

The PUFA can be in the form of a phospholipid, triglyceride, or a mixture thereof. However, the PUFA can also be in the form of a fatty acid or fatty acid ester.

If the composition containing the PUFA is a liquid, then preferably it is an oil. The oil may come from a variety of sources, including vegetable, animal and microbial sources. Vegetables sources include blackcurrant oil. Animal sources include fish oil or egg yolk lipid. Microbial sources are, however, preferred. These include fungal sources, such as a fungus of the order Mucorales. For example, the fungus may belong to the genus Mortierella, such as of the species *Mortierella alpina*. Such organisms can produce arachidonic acid (ARA).

Other microbial sources include algae. The algae may be a dinoflagellate and/or belong to the genus Crypthecodinium. In particular, the algae is *Crypthecodinium cohnii*.

Preferred PUFAs are a C18, C20 C22 ω-3 or a C18, C20 or C22 ω-6 polyunsaturated fatty acid. Preferred are the C20 or the C22 ω-3 or C20 or C22 ω-6 polyunsaturated fatty acids. These include not only arachidonic acid (ARA) but also eicosapentaenoic acid (EPA) and docosahexaenoic acid (DHA). Suitable methods for preparing these PUFAs are disclosed in the copending International application filed on the same day as the present application, also in the name of Gist-brocades B. V., and entitled "Preparation of microbial polyunsaturated fatty acid containing oil from a pasteurised biomass".

More than one PUFA can be added. In this case, two or more PUFAs may be from a different source, and therefore one may add either the PUFAs separately (as separate compositions) or mix the two PUFAs (to give a single composition) before addition during the foodstuff preparation process. For example, fish oil contains DHA which may be mixed with one or more microbial oils containing another PUFA (e.g. ARA).

In the process of the invention it is preferred that the starting oil phase does not contain any PUFAs. This is because they are suitably added later. The drying in (c), which is optional, can be performed by any suitable technique known in the art, although spray drying is preferred. Suitably in (c) the oil and aqueous phases are homogenised after initial mixing. The emulsion so formed will usually be an oil in water emulsion.

It is preferred that the source of the PUFA is a microbial oil and/or a fish oil. In this case, vegetable oils alone (i.e. not part of a mixture or blend) can be excluded such as maize, soy and/or corn oil. Preferably, the foodstuff will not contain a compound comprising a 2,2,4-trimethyl-2,2-dihydroquinoline moiety.

The aqueous phase can be thought of as a water-containing phase. It is thus possible for this aqueous phase to be an emulsion, for example a milk or milk product, such as evaporated, skimmed or semi-skimmed milk. Thus, the aqueous phase can refer to a substance where the continuous (or bulk) phase is aqueous.

Preferably the (PUFA) particles are added immediately after the drying in (c). The drying in preferred embodiments results in a spray-dried powder. The particles can then be added to the spray dried powder. The PUFA may be a component in an oil which may additionally contain lecithin, for example at 0.2 to 0.3%.

A suitable foodstuff preparation process, in particular an infant formula is outlined on page 11.

The point at which the PUFAs are added in the prior art is shown: here the PUFA is added to the oil blend. Also shown is the preferred stage of addition of the or each PUFA according to the present invention, much later on in the infant formula (IF) preparation process.

If the foodstuff is to be a liquid, then the particles can be simply added to the liquid that will form the final liquid foodstuff. However, if the foodstuff is to be a solid, for example a powder, then preferably the particles are mixed with the powder. Suitably the PUFA on the particles will remain liquid at room temperature, and therefore it can be absorbed on or coated on particles constituting the powder. The PUFA will suitably be in a liquid form (that is to say, the PUFA preferably does not solidify. Indeed, suitably the or each PUFA is a liquid at room temperature. Preferably, the PUFA will have a melting point that is from 5° C. to −10° C. In the powder form, the foodstuff preferably has a water content that is less than 5%, and preferably less than 1 or 2% (by weight).

In another embodiment of the invention, the particles are part of a "pre-mix". This can be an infant formula constituent additionally containing lactose and whey proteins and optionally vitamins and minerals. This can be added to an existing powder, that is to become the infant formula. Thus in a pre-mix some of the particles are mixed with various components that can be added to infant formula.

Preferably, with regard to stage (b) before or during mixing the oil and aqueous phases particles can be added. The resulting mixture can then be subjected to homogenisation. Here, the mixture can be forced through a small nozzle or hole at high pressure, and suitably at high shear forces. This can be accomplished using any well known technique in the art.

As previously discussed, the preferred method of drying the emulsion, if the foodstuff is to be solid (such as a powder) is by spray drying. Here the emulsion can be reduced to a water content of from 2 to 5%. Spray drying techniques are well known in the art: usually one provides a tower at the top of which is a spinning disk or nozzle onto which or through which the emulsion is passed. This yields (often fine) droplets in the form of a mist or aerosol. The resulting particles are dried at a temperature of from 70 or 80° C. to 140° C.

The resulting particles have an average diameter of from 5 to 1000 $\mu$m, such as from 50 to 200 $\mu$m. Generally speaking it consists of a matrix of the components that were in the aqueous phase, inside of which are the oil particles that were previously present in the oil in water emulsion.

The resulting particles can be further dried, for example on a fluidised bed. Here, particles may be subjected to hot air, and may be moved either on a conveyer belt or on a vibrating surface. Suitably there is a temperature gradient, such as from 80 to 20° C. The particles can be dried at from 3 to 10 such as from 4 to 6 minutes. Preferably, they will have a final water content of from 0.5 to 6 such as from 1 to 3% by weight.

The PUFA can then be added. This may be as a liquid or solid (e.g. lipid composition). The PUFA can be added directly after spray drying, during spray drying (if the temperature is lowered) or later at the same time as one or more other ingredients such as vitamins, minerals, trace elements, whey protein concentrate and/or carbohydrates) are added.

For example, the PUFA may be added when the powder is present (or being dried) on a fluidised bed.

In the prior art the PUFAs are added to the oil blend which is then mixed and heated with other ingredients. This is then homogenised to form an emulsion. The emulsion is then cooled. The various processes then diverge depending on the type of infant formula (IF) product to be produced.

Also shown is when the PUFA is (preferably) added according to the process of the invention. Processes A and B both produce liquid IF products, the latter being a concentrate, suitable for dilution. In both pathways the PUFA is added after homogenisation, but before sterilisation. A PUFA is usually added before the infant formula is added (or filled) into a vessel in preparation for sterilisation.

Taking process C this produces a solid (e.g. powder) IF product, the PUFA is preferably added after the drying stage (referred to as (c) stage previously); again this maybe before the material is added to, or filled, into a vessel. There is no sterilising stage here, since that can be performed after addition of the powdered product to water.

Thus, in a preferred process, the invention in the first aspect comprises:

a) providing an aqueous phase, or a water-containing phase, to which is optionally added other ingredients such as water, whey proteins (usually solids: a by-product of cheese-making), lactose, and/or maltodextrin. All these ingredients can be mixed and/or heated. This phase may in fact be an emulsion, and is preferably derived from milk;

b) providing an oil phase. This phase may contain vitamins and/or emulsifiers. Once added, the oil phase can be mixed and/or heated;

c) mixing the oil and aqueous phases, to form an emulsion: preferably, this is homogenised;

d) optionally, cooling the (e.g. homogenised) emulsion, which may then be stored;

e) optionally, adding further ingredients such as vitamins, minerals and/or pH adjusters;

f) optionally concentrating the resulting material;

g) if the foodstuff is to be liquid, optionally pre-heating and/or subjecting to ultra-high temperature (UHT) treatment;

h) optionally homogenising if the foodstuff is to be a liquid, but if the foodstuff is to be a solid, such as a powder, performing drying (such as spray drying);

i) adding one or more particles of the first aspect and optionally ingredients such as vitamins and/or minerals;

j) filling a container with the material obtained; and k) if the material is a liquid, subjecting it to sterilisation.

In a particularly preferred process of the present invention, the foodstuff is prepared as follows:

a) Standardising milk (either pasteurised, skimmed, semi-skimmed or half-fat milk) by addition of whey protein concentrate, minerals, water-soluble vitamins, trace elements and/or carbohydrates. This standardisation is achieved by mixing and/or heating, for example at 50 to 70° C.;

b) Preparing an oil phase, containing an oil (e.g. vegetable) oil, oil-soluble emulsifiers, oil-soluble vitamins and/or antioxidants. These ingredients can be mixed and then preferably heated (to improve mixing), for example at 50 to 70° C.;

c) Mixing the oil phase with the aqueous phase, and optionally heating, so as to form an emulsion;

d) Homogenising the emulsion. This can be performed at an elevated temperature and/or pressure. It may also be performed in one or more steps, such as in two stages. If heating is performed, then this is from preferably at from 50 to 70° C. If elevated pressures are used, then for example in a first stage this is at from 120 to 180 such as from 140 to 160 bar (Atm). In a second stage, the pressure can be at from 15 to 45, such as from 25 to 35 bar (Atm):

e) Cooling the homogenised emulsion. This may be to a temperature of from 3 to 7° C., such as from 4 to 6° C.;

f) Adding to the cooled emulsion other ingredients such as water soluble vitamins, minerals and/or trace elements;

g1) Sterilising the emulsion of (f), such as at ultra high temperatures (e.g. at least 100° C., such as from 110 to 140° C.) if the foodstuff is to be a liquid so that it is sterile; or g2) Pasteurising the emulsion of (f) and drying it (such as by spray drying) in order to give a dried material, such as a spray dried powder (sterilisation here may not be necessary since the water content can be so low that microorganisms will not be able to grow);

h) Adding the solid particles of the first aspect and optionally adding other (usually dry) ingredients, for example vitamins, minerals, trace elements, whey protein concentrate and/or carbohydrates.

As will have been apparent, a number of other various ingredients can be added to the foodstuff. These include sugars, proteins, vitamins, emulsifiers, minerals and/or pH adjusters. In the final foodstuff, the proteins are preferably present at from 0 to 35% by weight, the vitamins can be present at from 0 to 2% by weight, emulsifiers can be present at from 0 to 2% by weight as well, and minerals can be present at from 0 to 3% by weight.

Suitable minerals include calcium lactate, calcium chloride, zinc sulphate and/or copper sulphate. Preferred carbohydrates can include maltodextrin and/or lactose monohydrate.

Vitamins can include water soluble or oil soluble vitamins. Water soluble vitamins can include vitamin $B_1$ (thiamine hydrochloride), vitamin $B_2$ (riboflavin) vitamin $B_6$ (pyridoxine hydrochloride), vitamin $B_{12}$ (cyanocobalamin), folic acid, niacinamide, calcium-D-pantothanate, biotin, sodium ascorbate, carnitine (HCl) and/or taurine. Oil soluble vitamins can include vitamin A (acetate), vitamin D (calciferol), vitamin E (tocopherol acetate), vitamin $K_1$ (phytomenadione).

There are two preferred stages adding the PUFA during the preparation process.

The first is that the PUFA is added to the dried material, directly after spray drying, preferably while the dried material is on a fluidised bed.

In a second, the PUFA can be added after the spray drying process, preferably by means of mixing with the dried material, such as in a conventional mixer.

The solid carrier particles of the first aspect have been found to stabilise the PUFA. In other words, in this form, the PUFA can be more resistant to degradation, and less susceptible to oxidation. This may be due to at least part of the PUFA being present in some of the pores of the carrier particles.

In addition, since the particles may easily disperse in an aqueous phase, then the particles can be added at a relatively early stage during the formula manufacture process.

Preferably, the PUFA is added to an aqueous phase during the preparative process. For example, the solid particles can be added to the initial aqueous phase, prior to admixing with the oil phase, in order to form the emulsion. It may also, however, be added to the emulsion, before or after homogenisation. A further possibility is that the particles are added to the emulsion before the emulsion is subjected to drying, such as by spray drying. Thus, the particles could be added immediately prior to spray drying, for example at the top of a spray dryer.

The particles can alternatively be added at a later stage in the process, once the emulsion has been dried. Thus, the particles may be added to the bottom of the spray drier, or at the start, middle or end of additional drying stage (such as in a fluidised bed dryer which may immediately follow the spray drier).

A further possibility is that the carrier particles are added to an existing infant formula, or added to a spray dried powder, in which case PUFA may be added with other (usually dry) ingredients, such as vitamins, minerals, trace elements, whey proteins and/or carbohydrates.

The amount of PUFA in relation to the solid carrier will depend upon the carrier employed. As a guide, however, the concentration of PUFA can be from 5 to 200%, such as from 10 to 20% by weight of the carrier particles. Particularly high levels of PUFA can be obtained using silicon dioxide particles, where the PUFA can be present at almost twice the amount by weight as the solid carrier particles. With edible particles, for example comprising lactose, then one may prefer to have a lower amount of PUFA, for example up to about one fifth of PUFA by weight to the particles.

Particle sizes can vary from 50 to 800 µm, such as from 50 to 400 µm, preferably from 50 to 250 µm. Preferred particles comprise lactose, for example α-lactose monohydrate. These are available under the trade mark ZEPAROX, and have particle sizes between 50 and 300 µm. Other preferred particles comprise maltodextrin, and these are available under trade mark GLUCIDEX 19, and have particle sizes between 50 and 250 µm. These two examples are of the particles comprising a carbohydrate: if the particle is to comprise protein, then preferably a whey protein is employed. Suitable particles are available under the trade mark MIPRODAN 30, and have particle sizes between 20 and 400 µm. If the particles comprise lactose, then they may suitably have average particle size of about 75 microns.

The PUFA can be absorbed onto the solid carrier particles simply by mixing. Preferably, this will result in a homogenous mixture, such as a powder. Suitable types of mixers include tumbling, paddle, screw or blade mixers or continuous mixers. Alternatively, the PUFA can be added to the particles by pouring or atomization. Particularly preferred PUFA-containing compositions include lipids, like algal or fish (DHA oil), fungal (ARA) oil, vegetable (GLA) oil. Blends and/or mixtures of one or more of these oils can also be used.

Various other ingredients can be present in either the foodstuff or in the particles. These include antioxidants and/or chelating agents. These include natural tocopherols, ascorbic acid, ascorbyl palmitate, β-carotene and lecithin. The PUFA-containing composition can be diluted with food grade oils or oils suitable for use in infant formula, and this includes certain vegetable oils. It is also possible to add other materials to the PUFA containing composition (which is usually a liquid), it is then adsorbed on to the carrier, for example oil soluble vitamins.

The foodstuff can be not only in infant formula, but also a nutritional supplement. For example, the foodstuff can be suitable for people on a diet which needs supplementation by PUFAs, where the PUFAs are not commonly provided by the existing diet. In the case of nutritional supplements, particles of the first aspect can be incorporated into capsules (eg gelatin capsules), tablets or sachets.

The invention will now be described by way of Example, is with reference to the following Examples which are provided for illustration and are not be construed as being limiting.

EXAMPLES 1–6
Solid carrier particles coated with different PUFAs were prepared. The components employed, and the preparation of the carrier particles, are shown in the following Table.
PREPARATION OF POWDERED PUFA's

| example nr. | type of Pufa oil supplier concentration Pufa in oil concentration Pufa oil in PP | type of antioxidant (AO) or type of emulsifier (EM) trade name and supplier concentration in Pufa oil or in PP | carrier trade name and supplier concentration in powder (remainder is PUFA oil) | production equipment type and supplier batch size production method |
|---|---|---|---|---|
| 1 | fungal Arachidonic acid oil (Gb) 40% ARA in Pufa oil 20% Pufa oil in PP | alpha-tocopherol (AO) Covitol ® F-1000, Henkel 2300 ppm in Pufa oil | alpha-lactose monohydrate Zeparox ®, Borculo 80% | planetary mixer N-50, Hobart 2 kg mixing for 10 min., 60 rpm, N$_2$ blanket |
| 2 | fungal Arachidonic acid oil Gb 40% ARA in Pufa oil 20% Pufa oil in PP | alpha-tocopherol (AO) Covitol ® F-1000, Henkel 2300 ppm in Pufa oil<br>------------------<br>------------------<br>lecithin (EM) VP ® 629, Lucas Meyer 9% in Pufa oil, 2% in PP | alpha-lactose monohydrate Zeparox ®, Borculo 78% in | planetary mixer N-50, Hobart 2 kg mixing for 10 min., 60 rpm, N$_2$ blanket |
| 3 | fish Docosahexaenoic acid oil Pronova 30% DHA in Pufa oil 20% Pufa oil in PP | alpha-tocopherol (AO) Covitol ® F-1000, Henkel 2800 ppm in Pufa oil | alpha-lactose monohydrate Zeparox ®, Borculo 80% | high shear ploughshare mixer FM 50, Lödige 15 kg mixing for 15 min., 200 rpm for shovels and 3000 rpm for chopper, N$_2$ blanket |
| 4 | fish Docosahexaenoic acid oil Pronova 30% DHA in Pufa oil 20% Pufa oil in PP | alpha-tocopherol (AO) Covitol ® F-1000, Henkel 2800 ppm in Pufa oil<br>------------------<br>------------------<br>lecithin (EM) | alpha-lactose monohydrate Zeparox ®, Borculo 78% | high shear ploughshare mixer FM 50, Lödige 15 kg mixing for 15 min., 200 rpm for shovels and 3000 rpm for chopper, N$_2$ blanke |

-continued

EXAMPLES 1–6

Solid carrier particles coated with different PUFAs were prepared. The components employed, and the preparation of the carrier particles, are shown in the following Table.

PREPARATION OF POWDERED PUFA's

| example nr. | type of Pufa oil supplier concentration Pufa in oil concentration Pufa oil in PP | type of anti-oxidant (AO) or type of emulsifier (EM) trade name and supplier concentration in Pufa oil or in PP | carrier trade name and supplier concentration in powder (remainder is PUFA oil) | production equipment type and supplier batch size production method |
|---|---|---|---|---|
| 5 | fungal Arachidonic acid oil Gb 40% ARA in Pufa oil 25% Pufa oil in PP | VP ® 629, Lucas Meyer 9% in Pufa oil, 2% in PP mixed d-tocopherol (AO) Covi-Ox ® T-70, Henkel 1500 ppm in Pufa oil ------------------ ------------------ a mixture of tocopherols, ascorbyl palmitate, citric acid monoglyceride ester and vegetable oil Grindox 1002, Danisco 500 ppm in Pufa oil | maltodextrin Glucidex ® 19, Roquette 75% | high speed mixer Grall ® 300, Colette 100 kg mixing for 10 minutes, speed 1 for mixing arm and chopper on |
| 6 | fungal Arachidonic acid oil Gb 40% ARA in Pufa oil 10% ARA-Pufa oil in PP ------------------ ------------------ fish Docosahexaenoic acid oil Nippon Suisan Kaisha 20% DHA in Pufa oil 10% DHA-Pufa oil in PP | in Arachidonic acid oil alpha-tocopherol (AO) Covitol ® F-1000, Henkel 2300 ppm in Pufa oil ------------------ ------------------ in Docosahexaenoic acid oil: tocopherols (AO) 5000 ppm in Pufa oil | whey proteins Miprodan ® 30 MD Foods 80% | fluidized bed granulator MP1, Aeromatic 3 kg fluidizing for 20 minutes while adding a mixture of ARA- and DHA-Pufa oil by top spraying with a rate of 30 ml per min. |

EXAMPLES 7–10

Four different infant formula were prepared, some using the solid carrier particles prepared in previous Examples. The particles were added at different stages in the infant formula manufacturing process. The details are shown in the following table.

ADDITION OF POWDERED PUFAS TO AN INFANT FORMULA PROCESS

| example nr. | composition of Powdered Pufa | type of infant formula (IF) | point at which Powdered Pufa is added to infant formula process | process method |
|---|---|---|---|---|
| 7 | 20% fungal ARA-Pufa oil 78% silicon dioxide 2% lecithin ------------------ ------------------ -- 20% fish DHA-Pufa oil 78% silicon dioxide | term dry instant IF to be reconstituted, 13 g + 90 ml water) | in water phase in batch tank before homogenisation. | - batch size 2000 kg dry IF - 27 kg of Powdered ARA-Pufa and 18 kg of Powdered DHA-Pufa were mixed - the Powdered Pufa mixture was added to the batch tank to the blended lipid phase and aqueous phase of the IF representing 1955 kg dry matter |

-continued

EXAMPLES 7–10

Four different infant formula were prepared, some using the solid carrier particles prepared in previous Examples. The particles were added at different stages in the infant formula manufacturing process. The details are shown in the following table.

ADDITION OF POWDERED PUFAS TO AN INFANT FORMULA PROCESS

| example nr. | composition of Powdered Pufa | type of infant formula (IF) | point at which Powdered Pufa is added to infant formula process | process method |
|---|---|---|---|---|
| | 2% lecithin | | | the addition of the Powdered Pufa mixture was carried out with a gravimetrically controlled screw-type Brabender feed module |
| 8 | 20% fungal ARA-Pufa oil 80% sucrose ------- ------------------- ------------- 20% fish DHA-Pufa oil 80% sucrose | preterm liquid IF (ready to drink) | in water phase in batch tank before homogenisation | - batch size 3000 kg liquid IF - 10.1 kg of Powdered ARA-Pufa and 9 kg of Powdered DHA-Pufa were mixed - the Powdered Pufa mixture was added to the batch tank to the blended lipid phase and aqueous phase of the IF representing 371 g dry matter - the addition of the Powdered Pufa mixture was carried out with a gravimetrically controlled screw-type Brabender feed module |
| 9 | 25% fungal ARA-Pufa oil 75% maltodextrin = example 5 ------------------- ------------------- -- 20% fish DHA-Pufa oil 78% alpha-lactose monohydrate 2% lecithin = example 4 | term dry instant IF (to be reconstituted 13 g + 90 ml) | in top of the spray drier at the spot of the spray forming near the nozzle | - batch size 30000 kg dry IF - 324 kg of Powdered ARA-Pufa and 270 kf of Powdered DHA-Pufa were mixed - the Powdered Pufa mixture was added to a MSD (Multiple Stage Dryer) type of spray drying tower near the nozzle where the liquid to be dried is atomized - the addition of the Powdered Pufa mixture was carried out with a gravimetrically controlled screw-type Brabender feed module coupled to the rate of spray drying |
| 10 | 10% fungal ARA-Pufa oil 10% fish DHA-Pufa oil 80% whey proteins = example 6 | term dry instant IF (to be reconstituted, 13 g + 90 ml) | at the end of the production process by mixing | - batch size 10000 kg dry IF - a premix was prepared containing 270 kg Powdered ARA-DHA-Pufa + the necessary amounts of vitamins and minerals + lactose to a total amount of 2000 kg - the premix was added to 8000 kg of spray dried IF and mixed in a conical Nauta mixer |

COMPARATIVE EXAMPLES 11 AND 14 AND EXAMPLES 12–16

The thermal stability of solid carrier particles containing PUFAS were compared with PUFAS alone. The thermal analysis method employed, and the results obtained, are shown in the following Table. The time was measured in minutes, up until the point at which oxidation products were formed. Oxidation increases the weight of the sample. This time is referred to as the "initiation time". It was found that for all compositions of the invention (Examples 12–16) the stability was considerably greater than the oil itself (comparative Example Nos. 11 and 14).

THE STABILITY INCREASE OF POWDERED PUFA'S COMPARED WITH PUFA'S

| example nr. | composition of Powdered Pufa or type of Pufa oil | initiation time at which oxidation products were determined by thermal analyses |
|---|---|---|
| 11 | fungal Arachidonic acid oil of Gb containing 40% ARA | 35 minutes |
| 12 | 20% fungal ARA-Pufa oil 80% alpha-lactose monohydrate = compositions of example 1 | 51 minutes |
| 13 | 20% fungal ARA-Pufa oil 78% alpha-lactose monohydrate 2% lecithin = composition of example 2 | 60 minutes |

-continued

COMPARATIVE EXAMPLES 11 AND 14 AND EXAMPLES 12–16

The thermal stability of solid carrier particles containing PUFAS were compared with PUFAS alone. The thermal analysis method employed, and the results obtained, are shown in the following Table. The time was measured in minutes, up until the point at which oxidation products were formed. Oxidation increases the weight of the sample. This time is referred to as the "initiation time". It was found that for all compositions of the invention (Examples 12–16) the stability was considerably greater than the oil itself (comparative Example Nos. 11 and 14).

THE STABILITY INCREASE OF POWDERED PUFA'S COMPARED WITH PUFA'S

| example nr. | composition of Powdered Pufa or type of Pufa oil | initiation time at which oxidation products were determined by thermal analyses |
|---|---|---|
| 14 | fish Docosahexaenoic acid oil of Pronova containing 30% of DHA | 48 minutes |
| 15 | 20% fish DHA-Pufa oil 80% alpha-lactose monohydrate = composition of example 3 | 55 minutes |
| 16 | 20% fish DHA-Pufa oil 78% alpha-lactose monohydrate 2% lecithin = composition of example 4 | 60 minutes |

*For thermal analysis apparatus Seiko ® 5200-H equipped with a TGA-220 oven for TG/DTA measurements (Thermal Gravimetry/Differential Thermal Analysis) was used to determine the initiation time.
The conditions were:
temperature programme: 20° → 130° C. at 30° per minute, then isothermic at 130°
atmosphere: oxygen (100 ml/min)
sample amount: 10 mg in an Pt sample holder
reference: open Pt sample holder

We claim:

1. Solid water-soluble porous carrier particles onto which at least one polyunsaturated fatty acid (PUFA) in liquid form has been coated or absorbed wherein said particles are edible by humans, dispersible or miscible in water and upon contact with water dissolve.

2. Particles according to claim 1 which comprise lactose, glucose, lecithin, maltodextrin or a whey protein.

3. Particles according to claim 1 wherein the amount of PUFA is at least 5% by weight of the particles.

4. A foodstuff comprising solid carrier particles according to claim 1.

5. A foodstuff according to claim 4 which is an infant formula.

6. The particles of claim 1 which comprise one or more carbohydrates or proteins.

7. The particles of claim 1 wherein said PUFA is present in a liquid microbial oil.

8. A process for the preparation of a foodstuff comprising a polyunsaturated fatty acid (PUFA), the process comprising in the following order:
  (a) providing an oil phase and an aqueous phase;
  (b) mixing the oil and water phases to obtain an emulsion; and
  (c) adding to said emulsion water soluble solid carrier particles onto which at least one PUFA in liquid form has been coated or absorbed and said water-soluble particles are edible by humans, dispersible or miscible in water and upon contact with water dissolve.

9. A process according to claim 8 wherein the solid carrier comprises lactose, glucose, lecithin, dextrin or a whey protein.

10. A process according to claim 8 wherein the PUFA that is added is contained in a different lipid.

11. A process according to claim 8 wherein at least two different PUFAs are coated or adsorbed onto said particles.

12. A process according to claim 8 wherein the PUFA is in a form of a triglyceride and/or phospholipid.

13. A process according to claim 8 wherein the PUFA is γ-linolenic acid (GLA), dihomo-γ-linolenic acid, arachidonic acid (ARA), docosahexaenoic acid (DHA) and/or eicosapentaenoic acid (EPA).

14. The process of claim 8 which further comprises between steps (b) and (c), the step of sterilizing the emulsion.

15. The process of claim 8 which further includes between steps (b) and (c), the step of drying the emulsion.

16. The process of claim 8 which further includes between steps (b) and (c), the steps of sterilizing and drying the emulsion.

17. A process for the preparation of a foodstuff comprising a polyunsaturated fatty acid (PUFA), the process comprising in the following order:
  (a) providing an oil phase and a water phase;
  (b) mixing the oil and water phases to obtain an emulsion;
  (c) drying the emulsion; and
  (d) mixing said dried emulsion with solid carrier particles onto which at least one PUFA in liquid form has been coated or absorbed wherein said particles are edible by humans and dispersible or miscible in water where upon the PUFA is liberated.

18. A process for the preparation of a foodstuff comprising a polyunsaturated fatty acid (PUFA), the process comprising in the following order:
  (a) providing an oil phase and a water phase;
  (b) mixing the oil and water phases to obtain an emulsion;
  (c) sterilizing and drying the emulsion; and
  (d) mixing said dried and sterilized emulsion with solid carrier particles onto which at least one PUFA in liquid form has been coated or absorbed wherein said particles are edible by humans and dispersible or miscible in water where upon the PUFA is liberated.

* * * * *